(12) United States Patent  
Calverley et al.

(10) Patent No.: US 8,791,585 B2  
(45) Date of Patent: Jul. 29, 2014

(54) POWER SYSTEMS

(71) Applicant: Grant Howard Calverley, Friday Harbor, WA (US)

(72) Inventors: Grant Howard Calverley, Friday Harbor, WA (US); Scott Webster, Friday Harbor, WA (US)

(73) Assignee: Grant Howard Calverley, Friday Harbor, WA (US)

( * ) Notice: Subject to any disclaimer, the term of this patent is extended or adjusted under 35 U.S.C. 154(b) by 50 days.

(21) Appl. No.: 13/709,201

(22) Filed: Dec. 10, 2012

(65) Prior Publication Data

US 2013/0154275 A1 Jun. 20, 2013

Related U.S. Application Data

(60) Provisional application No. 61/630,641, filed on Dec. 14, 2011.

(51) Int. Cl.
| | |
|---|---|
| *F02B 63/04* | (2006.01) |
| *F03G 7/08* | (2006.01) |
| *H02K 7/18* | (2006.01) |
| *A63H 27/00* | (2006.01) |

(52) U.S. Cl.
USPC ...... 290/1 R; 400/120.01; 400/225; 400/234; 244/155 A; 242/334; 242/334.3

(58) Field of Classification Search
CPC ........ F03D 5/00; H02K 57/003; Y02E 10/70; F05B 2240/917; F05B 2240/921; Y02T 10/90
USPC ............ 290/1 A; 244/155 A; 242/334, 334.3; 400/120.01, 225, 234
See application file for complete search history.

(56) References Cited

U.S. PATENT DOCUMENTS

| | | | | |
|---|---|---|---|---|
| 3,053,481 | A |   | 9/1962 | Wyatt |
| 3,847,378 | A |   | 11/1974 | Roemer, Jr. |
| 4,012,674 | A | * | 3/1977 | Spitsbergen et al. ............. 318/7 |
| 4,015,799 | A | * | 4/1977 | Koski et al. ................ 242/334.4 |
| 4,079,828 | A | * | 3/1978 | Babler ......................... 400/219 |
| 4,094,478 | A | * | 6/1978 | Shroff et al. ............... 242/334.3 |
| 4,543,002 | A | * | 9/1985 | Bittner et al. ................ 400/212 |
| 4,752,842 | A | * | 6/1988 | Odagiri ........................ 360/74.1 |
| 4,924,240 | A | * | 5/1990 | Herbert et al. ................ 347/217 |
| 5,012,989 | A | * | 5/1991 | Whyte et al. .................. 242/334 |
| 5,281,038 | A | * | 1/1994 | Schofield et al. ............ 400/235 |
| 5,294,203 | A | * | 3/1994 | Williams ...................... 400/234 |
| 5,313,343 | A | * | 5/1994 | Yatomi .......................... 360/71 |
| 5,415,482 | A | * | 5/1995 | Poole et al. ................... 400/248 |
| 5,477,400 | A | * | 12/1995 | Kawamata ................. 360/73.09 |
| 5,604,652 | A | * | 2/1997 | Nishida et al. ............. 360/73.14 |

(Continued)

*Primary Examiner* — Pedro J Cuevas  
(74) *Attorney, Agent, or Firm* — Robert Plotkin, P.C.

(57) ABSTRACT

A power system comprises a tension harnessing arrangement to harness tension in a tether connected between a tensioning arrangement and storage means. The tension harnessing arrangement of the system comprises at least one first capstan roller arranged in a predetermined configuration. The tether tensioningly abuts at least a portion of the periphery of the first capstan rollers such that there is substantial contact between the tether and the first capstan rollers, thereby engaging the first capstan rollers to generate rotational energy. Alternatively, second capstan rollers engage with the first capstan rollers. At least one converter functionally co-operates with the first capstan rollers, either directly or via the second capstan rollers, for converting the rotational energy to energy in a transmissible form, storage form dissipative form, or a combination thereof.

20 Claims, 10 Drawing Sheets

(56) References Cited

U.S. PATENT DOCUMENTS

| | | | |
|---|---|---|---|
| 5,639,040 A * | 6/1997 | Honjo | 242/334 |
| 5,647,679 A * | 7/1997 | Green et al. | 400/232 |
| 5,649,672 A * | 7/1997 | Wolff et al. | 242/334 |
| 5,820,280 A * | 10/1998 | Fox | 400/611 |
| 5,906,444 A * | 5/1999 | Jorgensen | 400/229 |
| 5,971,634 A * | 10/1999 | Buckby et al. | 400/120.01 |
| 6,036,382 A * | 3/2000 | Middleton | 400/225 |
| 6,082,914 A * | 7/2000 | Barrus et al. | 400/234 |
| 6,128,152 A * | 10/2000 | Mace | 360/74.1 |
| 6,247,859 B1 * | 6/2001 | Butcher | 400/120.01 |
| 6,305,629 B1 * | 10/2001 | Chliwnyj et al. | 242/334.3 |
| 6,307,583 B1 * | 10/2001 | Randolph et al. | 347/217 |
| 6,315,471 B1 * | 11/2001 | Hsieh et al. | 400/234 |
| 7,188,808 B1 | 3/2007 | Olson | |
| 7,275,719 B2 | 10/2007 | Olson | |
| 7,722,268 B2 * | 5/2010 | McNestry et al. | 400/223 |
| 8,221,009 B2 * | 7/2012 | McNestry et al. | 400/120.01 |
| 8,221,010 B2 * | 7/2012 | McNestry et al. | 400/120.01 |
| 8,328,441 B2 * | 12/2012 | McNestry et al. | 400/120.01 |
| 8,591,127 B2 * | 11/2013 | McNestry et al. | 400/120.01 |
| 2004/0041047 A1 * | 3/2004 | Karp et al. | 242/334.3 |
| 2010/0230968 A1 | 9/2010 | Chernyshov | |
| 2010/0308174 A1 * | 12/2010 | Calverley | 244/155 A |
| 2011/0266809 A1 * | 11/2011 | Calverley | 290/55 |
| 2012/0086763 A1 * | 4/2012 | McNestry et al. | 347/197 |

* cited by examiner

POWER SYSTEMS

FIELD OF THE DISCLOSURE

The present disclosure relates to power systems, particularly to tether based power systems.

In particular, this disclosure relates to conversion of linear motion and tension in a tether to other usable forms of power.

DEFINITIONS

The expression 'tether' used hereinafter in the specification refers to but is not limited to at least one rope or cord, having very low coefficient of friction in the range 0.9 to 1.2, preferably made of Ultra high molecular weight polyethylene (UHMWPE).

The expression 'hydropower systems' used hereinafter in the specification refers to but is not limited to tether based power systems that derive power from energy associated with sea/ocean waves, tides, currents and falling/flowing water.

The expression 'wind power systems' used hereinafter in the specification refers to but is not limited to tether based power systems that derive power from wind energy.

The expression 'capstan roller' used hereinafter in the specification refers to but is not limited to rotating machines including rollers, capstans, sheaves, pulleys, wheels and the like.

The expression 'ground' used hereinafter in the specification refers to but is not limited to the surface of the earth and includes the bottom of the ocean/sea.

The expression 'pedestal' used hereinafter in the specification refers to but is not limited to a monolithic support structure, base, core or frame that serves as mounting means.

These definitions are in addition to those expressed in the art.

BACKGROUND

The demand for energy is ever increasing due to economic growth, industrialization, growing population and the growing needs of the population. With challenges posed in the field of energy generation due to climatic changes, insufficient rain, strict environmental norms and government regulations, low availability of resources and fossil fuel depletion, there is felt a need for a shift towards alternative sources of clean, economical, and renewable energy. There is also a need for renewable power generation that delivers massive amount of clean, economical and reliable power to cater to the ever increasing demand.

Although, prior art suggests use of wind power generators or wind mills for extracting wind energy and converting wind energy into useful power, wind mills known in the prior art have numerous drawbacks associated with use thereof. For instance, wind mills fail to consistently and efficiently generate power from wind, which is inherently random and variable. Constant efforts are being made to develop efficient and reliable systems to harness wind energy; tether power systems playing an important role in this endeavor.

A tether is typically connected to wind power or hydropower systems at one end while the other end of the high strength tether is wound around a spool attached to a generator on the ground. During an outbound stroke, the tether is pulled out from the spool attached to the generator on the ground; reel-in is initiated during a retrieval stroke and the tether is stored in a storage means. Tension in the tether causes linear motion of the tether, and as the tether moves, the spool disposed on the ground rotates. The spool transfers rotational motion thereof to the generator connected thereto for generation of power. A relatively small amount of power is required for retrieval of the tether. The difference between the power generated during the outbound stroke and power spent for retrieving the tether is the resultant power generated.

In a nutshell, tension and linear motion of the tether is utilized for generation of power. However, it is very critical that tension in the tether is harnessed effectively for efficient generation of power. Also, any wear of the tether is detrimental and hampers power generation. The tether is quite an expensive component due to its length thereof. Accordingly, there is a need for minimizing wear and tear of the tether wrapped around the spool.

OBJECTS

Some of the objects of the present disclosure aimed to ameliorate one or more problems of the prior art or to at least provide a useful alternative are described herein below:

An object of the present disclosure is to provide a ground based power system for efficiently handling tethers used in wind/hydro power systems.

Another object of the present disclosure is to provide a ground based power system that reduces wear and tear of tethers used in wind/hydro power systems.

Still another object of the disclosure is to provide a ground based power system that effectively harnesses tension and motion of tethers used in wind/hydro based power systems.

One more object of the disclosure is to provide a ground based power system that harnesses tension and motion of tethers used in wind/hydro power systems and converts it to other usable forms of power in a cost effective manner.

Still one more object of the present disclosure is to provide a ground based power system that is reliable.

Yet another object of the present disclosure is to provide a ground based power system that can be repaired while still in service.

Still another object of the present disclosure is to provide a ground based power system that is robust in construction.

Another object of the present disclosure is to provide a ground based power system that is easy to maintain.

These and other objects of the present disclosure are dealt with to a large extent by the descriptive matter and the accompanying drawing(s) in which exemplary embodiments of the disclosure are illustrated.

SUMMARY

In accordance with the present disclosure, there is provided a power system comprising:
  a tether having a first end and a second end, the tether connected at the first end to a tensioning arrangement adapted to regulate tension in the tether, and a storage means at the second end;
  a tension harnessing arrangement comprising at least one first capstan roller arranged in a predetermined configuration, the tether tensioningly abutting at least a portion of the periphery of the at least one first capstan roller such that there is substantial contact between the tether and the at least one first capstan roller, thereby engaging the at least one first capstan roller to generate rotational energy; and
  at least one converter functionally co-operating with the at least one first capstan roller for converting the rotational energy to at least one of a transmissible form, storage form and of dissipative form of energy.

In accordance with one embodiment, the power system described herein above further comprises at least one second capstan roller engaged with the at least one first capstan roller by an engagement means selected from the group consisting of frictional contact and coupling arrangement provided therebetween, the coupling arrangement being at least one of a gear, chain, rope and belt-pulley arrangement, wherein the at least one converter is adapted to be coupled to the at least one second capstan roller.

In accordance with another embodiment, the power system described herein above further comprises a tether handling arrangement disposed between the tensioning arrangement and the tension harnessing arrangement, the tether handling arrangement configured on at least one of a swivelable turn table, a snatch block and a sheave being adapted to facilitate twist free handling and free movement of the tether.

In accordance with yet another embodiment, the power system described herein wherein the first capstan rollers are engaged to each other by an engagement means selected from the group consisting of gear, chain, rope and belt-pulley arrangement.

In accordance with still another embodiment, the power system described herein above further comprises at least one auxiliary tensioning device adapted to either receive the tether from the tension harnessing arrangement or guide the tether to the tension harnessing arrangement and further adapted to retain tension in the tether, the auxiliary tensioning device being at least one of an idler pulley, tensioning pulley and a back tensioning device.

In accordance with still another embodiment, the power system described herein above further comprises at least one auxiliary tensioning device disposed at a location selected from the group consisting of (i) between the tensioning arrangement and the tension harnessing arrangement, (ii) between the tension harnessing arrangement and the storage means and (iii) on either side of the tension harnessing arrangement.

In accordance with an additional embodiment, the power system described herein above further comprises at least one of the subsystems selected from the group consisting of:
- measurement and control system comprising instrumentation and sensors for measuring and controlling parameters associated with the tether tensioning arrangement;
- adjustment and alignment control system adapted to co-operate with the tether tensioning arrangement; and
- safety management system adapted to circumvent problems associated with debris, wear due to prolonged use and weather conditions.

Typically, in accordance with the present disclosure, the tether tensioning arrangement is associated with at least one of wind power systems, hydropower systems and tethered vehicle control systems.

Preferably, the storage means is adapted to store the tether and further adapted to facilitate smooth reeling in and payout of the tether.

Alternatively, the tether harnessing arrangement is anchored to the ground.

Preferably, the predetermined configuration is achieved on a pedestal adapted to withstand tension in the tether and compression loads in the tether harnessing arrangement; the pedestal being at least one of reinforced concrete core, composite material core and steel core.

In accordance with the present disclosure, several alternatives of the predetermined configuration have been envisaged. In accordance with one aspect, the configuration is a curved profile with the first capstan rollers being disposed along the periphery thereof. In accordance with another aspect, the configuration is a polygon with the first capstan rollers being disposed at least at vertices thereof. In accordance with yet another aspect, the configuration is a polygon with the first capstan rollers being disposed at least at vertices thereof with an angle of contact between the tether and at least some of the first capstan rollers being 45 degrees. In accordance with still another aspect, the configuration is a polygon with the capstan roller pairs being disposed at least at vertices thereof with an angle of contact between the tether and at least some of the first capstan rollers being 90 degrees.

Preferably, at least one of the first capstan rollers has at least one groove configured thereon, wherein each of the grooves is adapted to receive at least a portion of the tether therein. Accordingly, each of the grooves is adapted to serve as an anti-slip arrangement for the tether received therein.

Again, the first capstan rollers are disposed such that the axles of the first capstan rollers are at a pre-determined angle with respect to each other.

In accordance with an alternative embodiment of the present disclosure, there is provided a power system comprising:
- a tether having a first end and a second end, the tether connected at the first end to a tensioning arrangement adapted to regulate tension in the tether, and a storage means at the second end; and
- a tension harnessing arrangement comprising at least one converter, the tether tensioningly abutting at least a portion of the periphery of the at least one converter such that there is substantial contact between the tether and the at least one converter, thereby engaging the at least one converter to generate energy in at least one of a transmissible form, storage form and dissipative form.

Typically, the converter is selected from the group of energy conversion means consisting of motor generators, linear motor generators, hydraulic motors, compressors and pumps.

BRIEF DESCRIPTION OF THE ACCOMPANYING DRAWINGS

The features of the power system of the present disclosure will become fully apparent from the following description, taken in conjunction with the accompanying drawings. Understanding that these drawings depict only typical embodiments of the disclosure and are, therefore, not to be considered limiting of its scope, the disclosure will be described with additional specificity and detail through use of the accompanying drawings in which.

DETAILED DESCRIPTION OF THE ACCOMPANYING DRAWINGS

Figure 1A:
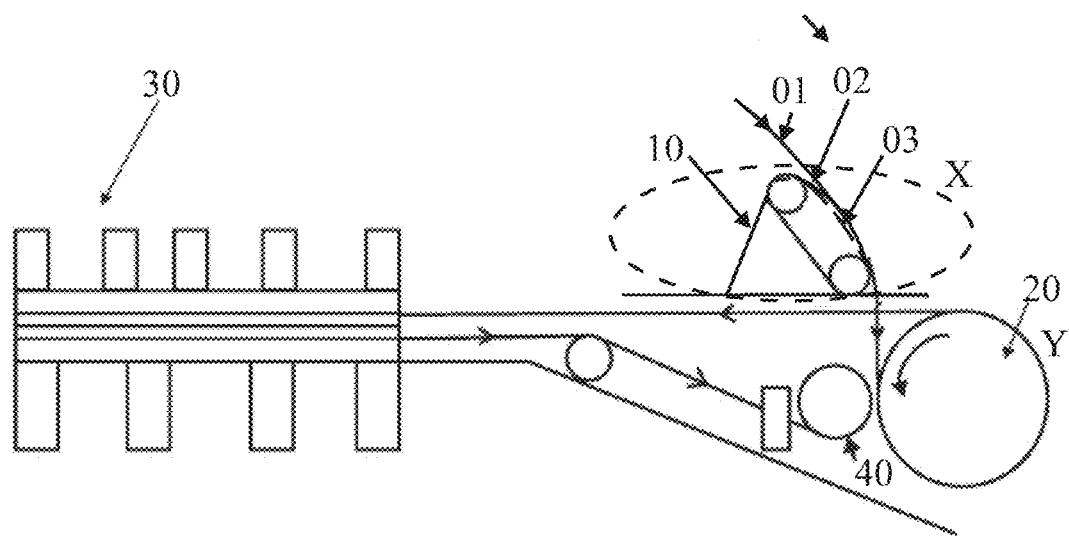
FIG. 1A illustrates a side view of a power system in accordance with a first embodiment of the present disclosure with a single large diameter capstan.

The power system of the present disclosure will now be described with reference to the embodiments shown in the accompanying drawings. The embodiments do not limit the scope and ambit of the disclosure. The description relates purely to the exemplary embodiments of the disclosure and its suggested applications.

The present disclosure envisages a ground based power system that is aimed at handling tethers used in wind/hydro power systems or any other power system that utilizes tension in the tether and linear motion of the tether due to tension in the tether for generation of power. The system of the present disclosure also finds application in tethered vehicle (flying or floating) control, especially in systems involving very long tethers for connecting tethered aerostats, gliders, kites, gyrogliders, towed boats, barges and the like, typically serving as persistent tethered military, surveillance or communication assets. More particularly, the power system of the present disclosure is aimed at effectively harnessing tension in the tether by ensuring minimum wear and tear of the tether. Tension in the tether may be induced by any means and is not limited to pulling of the tether by a kite. However, for ease of explanation, the description herein below refers to a tether connected to a kite.

A power system in accordance with the present disclosure harnesses tension in a tether having a first end and a second end. A tensioning arrangement is connected at the first end to regulate tension in the tether. The tensioning arrangement is typically associated with either wind power systems or hydropower systems. The second end of the tether is connected to a storage means that stores the tether and also facilitates smooth reeling in and payout of the tether. A tension harnessing arrangement of the system of the present disclosure comprises at least one first capstan roller arranged in a predetermined configuration. The tether tensioningly abuts at least a portion of the periphery of the first capstan rollers such that there is substantial contact between the tether and the first capstan rollers, thereby engaging the first capstan rollers to generate rotational energy. In another embodiment, at least one second capstan roller engages with the first capstan rollers via an engagement means. The engagement means between the first capstan rollers and the second capstan rollers is either frictional contact or a coupling arrangement like gears, chain, rope or belt-pulley arrangement to preferably cause rotation of the second capstan rollers at rotational speeds higher than rotational speeds of the first capstan rollers.

At least one converter functionally co-operates with the first capstan rollers for converting the rotational energy to energy in either a transmissible form, storage form dissipative form or a combination thereof. In the embodiment wherein the second capstan rollers engage with the first capstan rollers, the converter is coupled to at least one of the second capstan rollers. The converters typically work in a motor mode for facilitating reeling in of the tether into the tether storage means during a retrieval stroke or in a generator mode during payout of the tether during an outbound stroke. Accordingly, the capstan rollers function either in a driving or in a driven mode. Although, the description of the system of the present disclosure is directed towards transmitting and storage of energy harnessed from the tension in the tether, it is generally understood that energy could also be dissipated especially during dynamic braking/payout of the tether, specifically, when the power system of the present disclosure is used in tethered vehicle control systems.

In accordance with an embodiment, the system of the present disclosure further includes a tether handling arrangement that is disposed between the tensioning arrangement and the tension harnessing arrangement to facilitate twist free handling and free movement of the tether. Typically, the tether handling arrangement is configured on a swivelable turn table, a snatch block or a sheave.

Figure 1B:
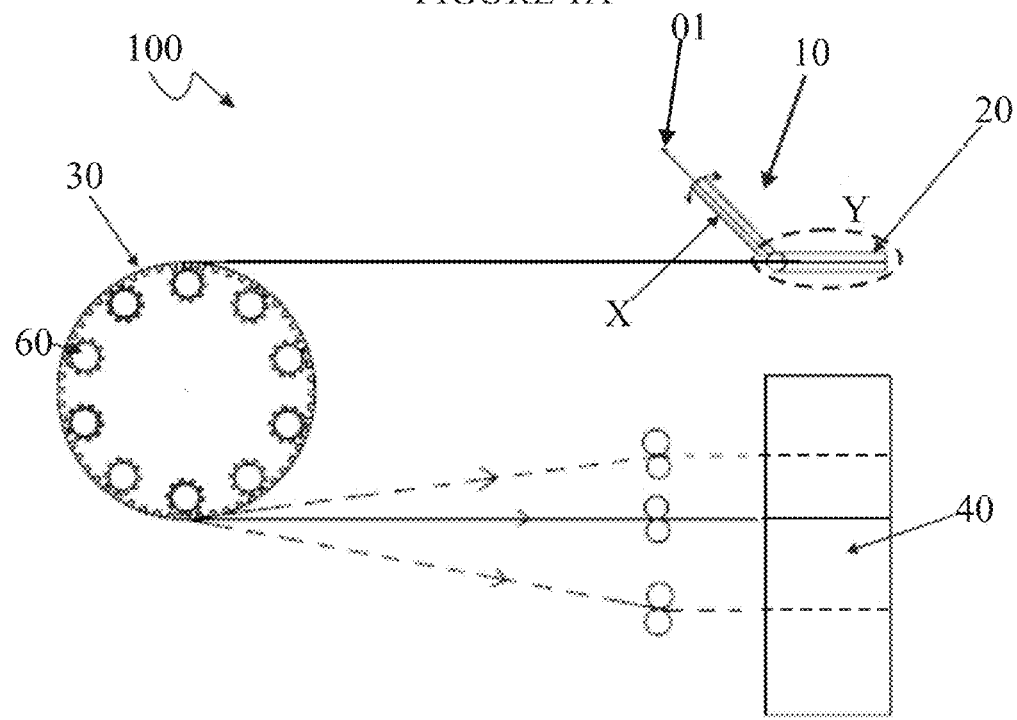
FIG. 1B illustrates a top view of the power system of FIG. 1A.
Figure 1C:
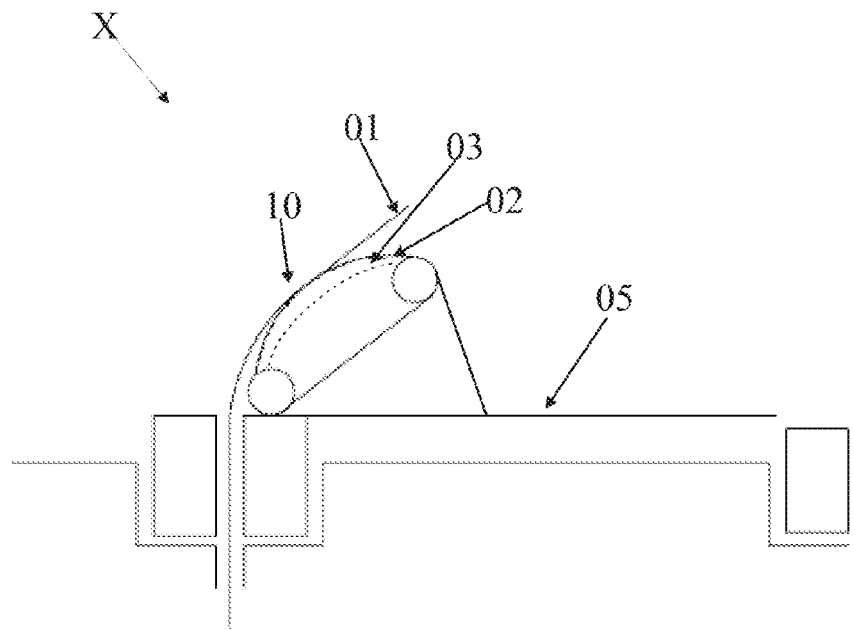
FIG. 1C illustrates an enlarged view of a kite tracker 10 illustrated in FIG. 1A and represented generally as X.
Figure 1D:
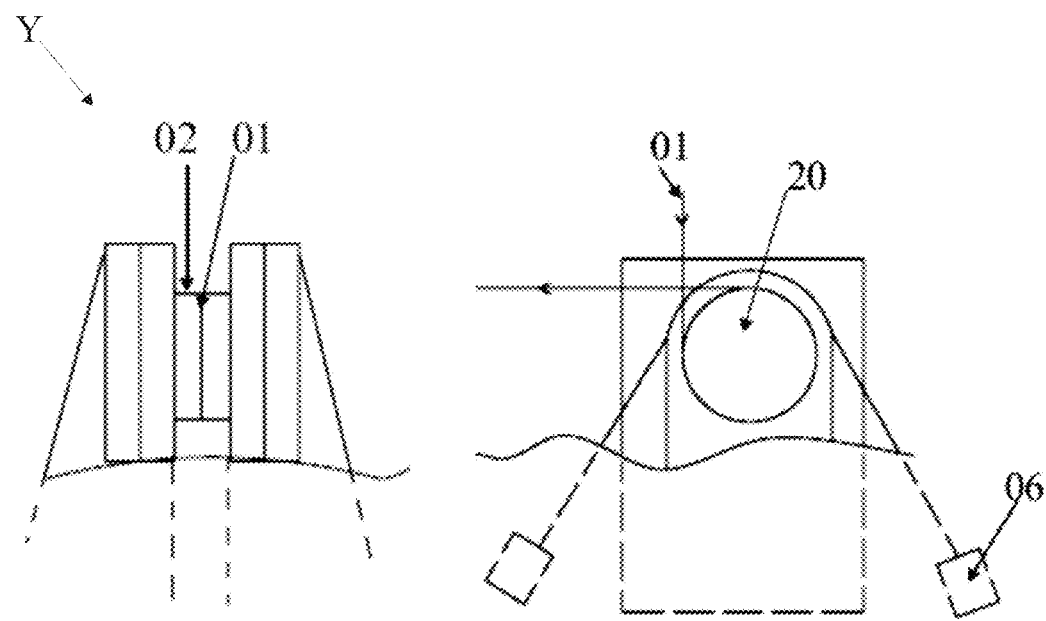
FIG. 1D illustrates an enlarged side view and front view respectively of an idler pulley 20 illustrated in FIG. 1A and represented generally as Y.

FIG. 1A and FIG. 1B of the accompanying drawings illustrates a side view and a top view respectively of a power system 100 with a single large diameter capstan roller in accordance with a first embodiment of the present disclosure. The power system 100 includes a tether handling arrangement in the form of a kite tracker 10, an auxiliary tensioning device in the form of an idler pulley 20 of a large diameter, a first capstan roller in the form of a capstan roller 30 of a large diameter, a storage means in the form of a rotating tether storage spool or a tether tank 40. FIG. 1C illustrates an enlarged view of the kite tracker 10 illustrated in FIG. 1A and is represented generally as 'X' while FIG. 1D illustrates an enlarged side view and front view respectively of the idler pulley 20 illustrated in FIG. 1A and is represented generally as 'Y'.

A tether 01 connected to, say, a kite, is guided by a kite tracker 10, a freely rotating deck with a free spinning belt 02 provided with stainless steel bearings 03, typically roller bearings. In accordance with another aspect, the bearings are small rollers each having its own bearing set and axle. The belt 02 is a continuous belt that wraps around the kite tracker 10. The idler pulley 20 and the capstan roller 30 are also each provided with a belt that is set up on stainless steel roller bearings as is the case with the kite tracker 10. In accordance with another aspect, the roller bearings of the belt associated with the idler pulley 20 and the capstan roller 30 are at least one of roller bearings or small rollers each having its own bearing set and axle or ball bearings in a bearing case. The kite tracker 10 is disposed on a turntable 05 and pivots 360° with the tether 01 being fed down the exact center of the turntable 05. The kite tracker 10 allows the kite to fly in any quadrant of the sky or at any azimuth without twists in the tether 01 and obviates need for complicated rotating machinery. The kite tracker 10 in accordance with another aspect is mounted upside down under a barge and connected to a sea current rope generator. The kite tracker 10 in accordance with one more aspect is a single large sheave or an idler pulley that is mounted on a turntable as illustrated in FIG. 1C. In accordance with yet another aspect, the kite tracker 10 comprises multiple smaller pulleys that directly bear on the rope without a belt but are mounted upside down on a turntable in the same orientation as the kite tracker illustrated in FIG. 1C.

The tether 01 from the kite tracker 10 goes down to the idler pulley 20 where it changes direction from vertical to horizontal. The geometry of the kite tracker 10 ensures that vertical and horizontal loads are uniformly distributed. The belt 02 around the idler pulley 20 spins based on friction and tension in the tether 01 as it passes around the periphery of the idler pulley 20. The tether 01 leaving the idler pulley 20 thereafter passes over the belt 02 that wraps around the capstan roller 30 which is provided with deep concrete footings to withstand enormous tether tension as well as compression loads. A reinforced concrete pedestal of the idler pulley 20 is designed to absorb large uplifting and compressive forces. The belt 02 runs through a recess formed in the concrete, which prevents slippage of the belt 02 off the concrete pedestal. While the pedestal is made of concrete, the entire structure is tied down with cable hold-downs 06 in the same way that suspension bridges are anchored to the ground. This is less intensive than relying on the weight of huge concrete foundation to prevent uplift as uplift might be of the order of 100,000 kilos in large systems.

The tether 01 is finally guided to a tether storage means, for instance, a spool or a tether tank 40. The large size of the capstan roller 30 and the idler pulley 20 prevents bending of the tether 01 at sharp angles as is the case with small sized capstan rollers, thereby reducing wear and heating up of the tether 01 and accordingly exponentially extending the life of the tether 01.

The capstan roller 30 co-operates with a plurality of converters, for instance, motor-generators 60 disposed along the inner periphery of the capstan roller 30. The motor-generators 60 work as motors or generators depending upon requirement. Each of the motor generators 60 either work as a motor for facilitating reeling in of the tether 01 into the tether storage spool 40 during a retrieval stroke or as a generator during payout of the tether 01 during an outbound stroke.

As the tether 01 is pulled by the kite, the tether 01 becomes taut and initiates linear motion in the form of payout of the tether 01 from the tether storage spool 40. The linear motion of the tether 01 is transmitted to the capstan roller 30 via the belt 02. The capstan roller 30 starts rotating and the rotational torque of the capstan roller 30 is transferred to the plurality of motor-generators 60. The motor generators 60 rotate and power is generated. The rotational torque from the capstan roller 30 is transmitted via gears to the motor generators 60. The motor-generators 60 are pinion gear meshed into a toothed portion of the belt 02 that circulates around the concrete center on the bearings 03. In accordance with the present disclosure, the bearings are typically roller bearings or small rollers each having its own bearing set and axle. In accordance with another aspect, the motor-generators 60 are mounted on the outside of the periphery of the capstan roller such that the belt 02 and the bearings 03 run in a recess in the concrete so that the belt 02 does not slip off of the concrete when under great compression. The present disclosure is however not limited to any particular mechanism for transmitting rotational torque from the capstan roller 30 to the motor generators 60. Use of multiple motor-generators 60 provides redundancy for equipment failure and also allows for custom power extraction and retrieval during very high tension as well as very low tensions in the tether 01 at different speeds by turning ON/OFF of the individual motor-generators 60 as per requirement. Also, use of multiple motor-generators 60 provides reliability and easier maintenance by facilitating hot swap and maintenance of the individual motor-generators 60 while the power system 100 is still in service. The power system 100 can also be configured to extract more power as more motor-generators 60 can be brought online, if the wind speeds are substantially higher and accordingly, the wind energy is optimally captured. Once all tension in the tether is harnessed by the capstan roller, the tether 01 is fed into the tether storage spool 40 where the tether is carefully laid down in rows with a level winder device (not shown).

In accordance with an alternative aspect, all of the motor-generators 60 are replaced by linear motor generators that act like a Maglev train. In this embodiment, the converters in the form of linear motor generators are adapted to harness the tension in the tether without the need for first or second capstan rollers. Part of the motor is placed in the inner pedestal (concrete side) and part is placed in the belt side.

Figure 1E:
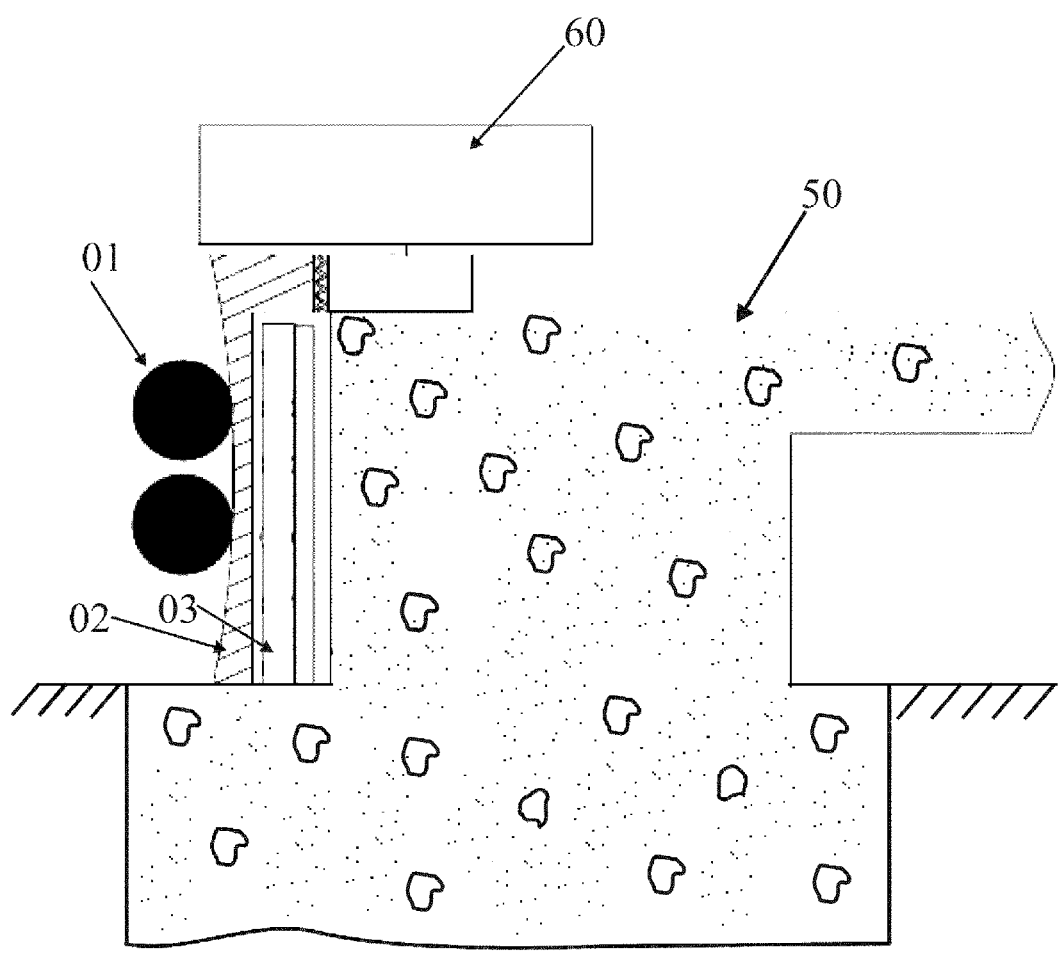
FIG. 1E illustrates a side view of the outer edge of the capstan roller 30 of the power system of FIG. 1A.

FIG. 1E illustrates a side view of the outer edge of the capstan roller 30 of the power system 100 of FIG. 1A with motor-generators 60 mounted inside the outer edge of the capstan roller 30 and disposed with its pinion gear meshed into a toothed portion of the belt 02 which circulates around the concrete centre on the bearings 03. This simplified 'anti-reduction' gearing reduces mechanical losses.

The first embodiment of the present disclosure as described herein above uses about two or three wraps of tether around the capstan roller. Having a large diameter capstan roller is beneficial since tether wear due to wrapping around a tight radius is eliminated. However, according to the capstan equation, the diameter of the capstan is not a contributor to the holding power of a capstan. The coefficient of friction of the tether and the number of wraps around the capstan are bigger factors. Ultra high molecular weight polyethylene (UHMWPE) tethers have very low coefficient of friction and about 8 or more wraps are needed for larger holding power. Increasing the number of wraps may cause snarls as the tether moves around the surface of the capstan.

Figure 2:
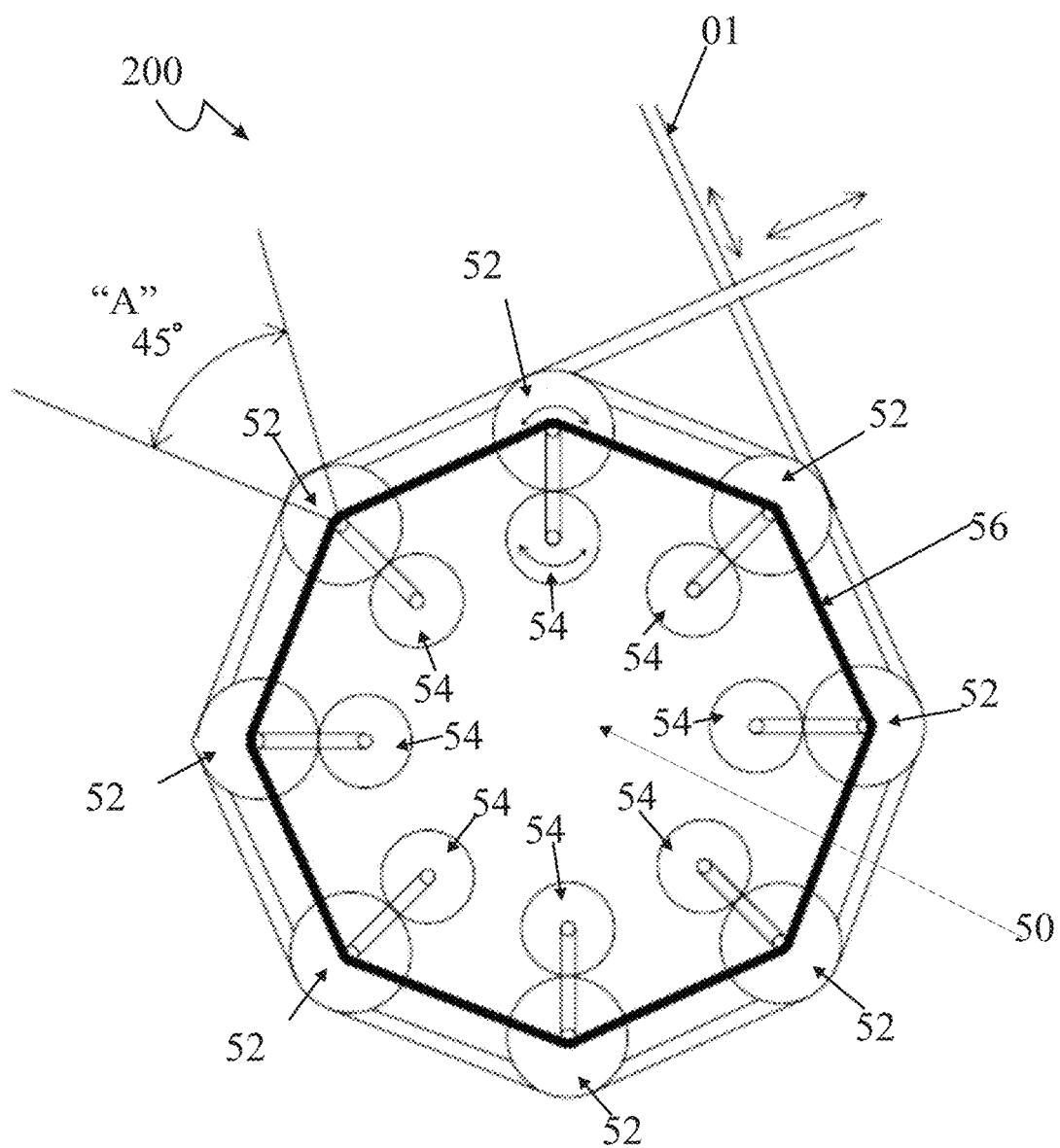
FIG. 2 illustrates a second embodiment of the system of the present disclosure with a plurality (8 Nos.) of grooved capstan rollers.

FIG. 2 illustrates a second embodiment of the system of the present disclosure with a plurality (8 Nos.) of grooved capstan rollers. The second embodiment aims to overcome the drawback of lesser number of wraps faced in the first embodiment. This facilitates use of UHMWPE ropes with a low coefficient of friction and the capstan equation also favors increased number of wraps for better holding power. The eight grooved capstan roller system generally referenced by the numeral 200 includes a polygon shaped (exemplary shape) concrete pedestal 50. The system 200 facilitates maintaining tension in the tether 01 for generation of power. The tether 01 is wrapped around the eight grooved capstan rollers 52 (serving as first capstan rollers), such that a portion of the tether 01 is in contact with at least a portion of the plurality of capstan rollers 52 disposed at the vertices of the concrete pedestal 50.

As the tether 01 is pulled by a wind/hydropower system, the linear motion of the tether 01 over the capstan rollers 52 causes rotation of the capstan rollers 52 disposed at the vertices of the concrete pedestal 50. The grooves provided around each of the capstan rollers 52 are provided with suitable dimensions to accommodate the tether 01. These grooves minimize compression of the tether 01 when it is under tension and also increase the surface area of the tether 01 in contact with the capstan rollers 52. This increases the transfer of tension to the capstan rollers 52 through friction. The surface area of contact between the tether 01 and the capstan rollers 52 is dependent on the angle of contact "A" between the tether 01 and each of the capstan rollers 52. In accordance with the second embodiment of the present disclosure, the angle of contact "A" between the tether 01 and most of the capstan rollers 52 is 45 degrees. In accordance with another aspect of the second embodiment, the grooved capstan rollers 52 are staggered in such a manner that the tether 01 spirals around the rollers in a helix coil fashion. Such a configuration of the tether facilitates retaining of tension in the tether. In case of the grooved capstan rollers 52, the subsequent wraps of the tether 01 wrapping around the capstan rollers 52 are separated by the grooves and there is no overlapping of the tether 01 resulting in reduced heating of the tether 01 that may result from the up and down shifting of subsequent wraps of the tether 01 during rotation of the capstan rollers 52 in case the subsequent wraps of the tether 01 overlap each other.

The capstan rollers 52 are connected to each other by means of a mechanical connection in the form of a chain, rope, belt or gears 56. FIG. 2 illustrates the mechanical connection 56 in the form of a chain for connecting all the capstan rollers 52 together. Each of the capstan rollers 52 is respectively connected to a corresponding converter, in the form of a motor generator 54, such that the rotation of one of the capstan rollers 52 causes rotation of the corresponding motor generator 54. By providing a plurality of motor-generators 54, one or more motor-generators can be turned ON or OFF based on tension prevailing in the tether 01. The motor-generators 54 are inter-connected and each of the motor-generators is mechanically connected to one of the capstan rollers 52. Hence if low power is needed for retrieving the tether 01, only one motor of the plurality of motor-generators 54 can be actuated for spinning all the eight capstan rollers 52 together.

By using multiple rollers to make up the periphery of the concrete pedestal, smaller asynchronous variable speed AC traction motor-generators can be used, rather than individual very large ones. The advantage with these motor-generators is that they are readily available and are used on all types of electric trains and subways. The AC traction motors serve the function of a converter, typically a means to suitably convert rotational energy from the capstan rollers to a transmissible form, a storage form or both. Accordingly, the converters in accordance with alternative embodiments comprise hydraulic motors, compressors, pumps or other energy conversion systems.

The mechanical connection 56 between the motor-generators 54 and the capstan rollers 52 is provided to avoid slippage under conditions when only one capstan roller is and the rest of the capstan rollers are free spinning. If all the eight motor-generators 54 are always used, then the mechanical connection is not needed, because the speed of each motor-generator is electronically controlled to work in synchronization, as in the case of traction motors of an electric train when all the motors work to engage the train at the same speed.

A key advantage of the system 200 is that it is built in a modular fashion with modular components. Specifically, each motor-generator and capstan roller can be easily removed and replaced for service. This is unlike a large single capstan/generator system (for instance, system 100) that would require roof top access and a large crane to move the components. The modular configuration of the system 200 facilitates easy removal of the components, tether and flight vehicle from the concrete foundation and facilitates transportation to alternate foundations. This may be required during seasonal shifts in wind/water currents or as a result of any change that effects the tension in the tether in a detrimental manner resulting in the system becoming inefficient at the locale where it is installed.

Figure 3:
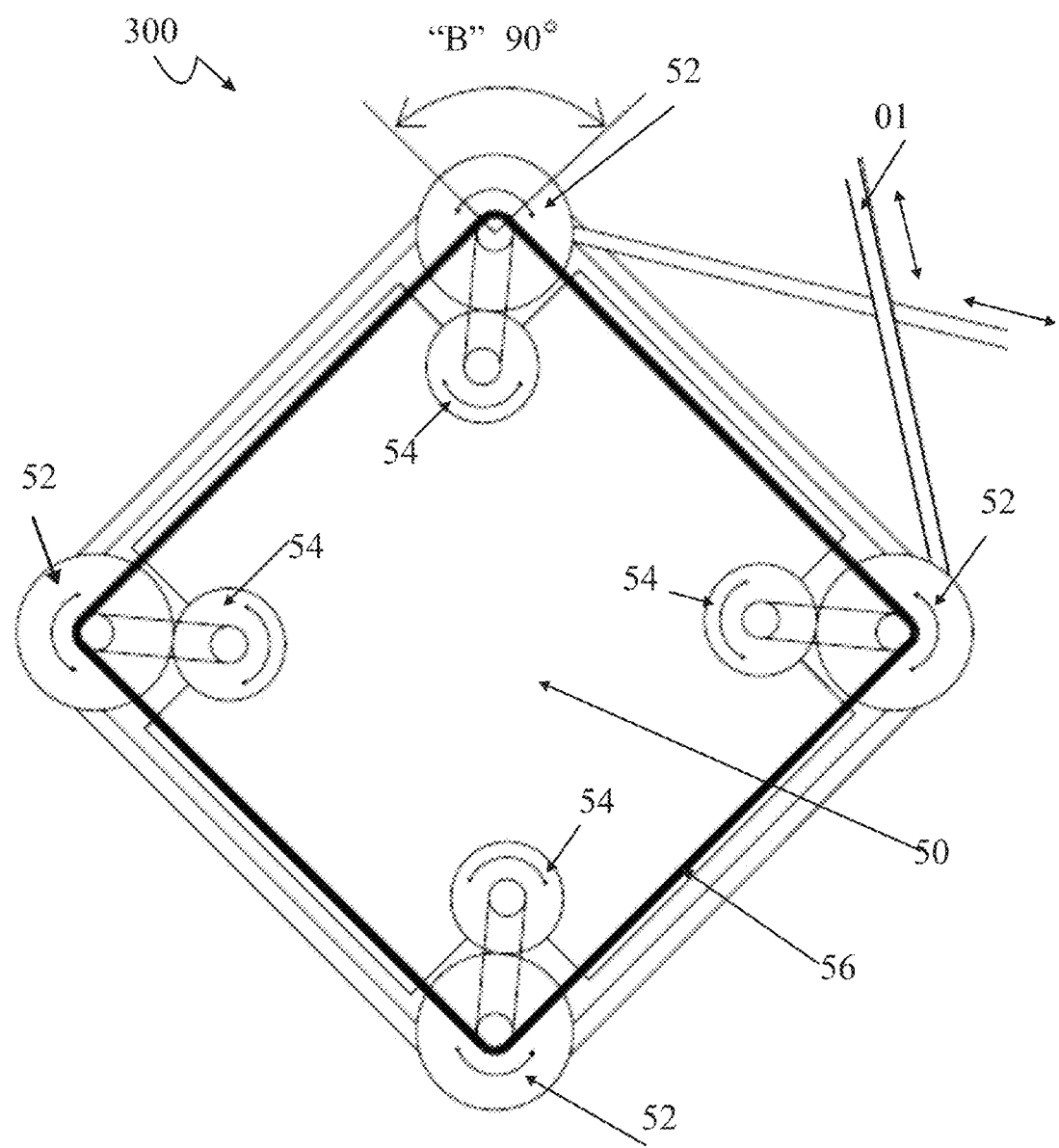
FIG. 3 illustrates an alternative embodiment [with a plurality (4 Nos.) of grooved capstan rollers] to the embodiment illustrated in FIG. 2.

FIG. 3 illustrates an alternative embodiment [with a plurality (4 Nos.) of grooved capstan rollers] to the embodiment illustrated in FIG. 2 and is generally referenced by the numeral 300. This system 300 includes a square shaped (exemplary shape) concrete pedestal 50. The system 300 facilitates maintaining tension in the tether 01 for generation of power. The tether 01 is wrapped around four capstan rollers 52, such that a portion of the tether 01 is in contact with at least a portion of the plurality of capstan rollers 52 disposed at the vertices of the concrete pedestal 50. The capstan rollers 52 disposed at the vertices are grooved rollers, similar to the grooved capstan rollers of FIG. 2. The surface area of contact between the tether 01 and capstan rollers 52 is dependent on the angle of contact "B" between the tether 01 and each of the capstan rollers 52. In accordance with present embodiment of the present disclosure, the angle of contact "B" between the tether 01 and most of the capstan rollers 52 is about 90 degrees. The angle of contact between the tether 01 and the capstan rollers 52 in the system 300 is more than the angle of contact between the tether 01 and the capstan rollers 52 in case of the system 200. Also, there are fewer bends in the tether 01 in the system 300 as compared to the system 200 resulting in longer tether life.

In the systems 200 and 300, having as large a diameter for the capstan rollers 52 as possible, is the key to minimizing rope wear. For systems working with higher tensions, having tension spread out over more capstan rollers might have an advantage. The system 300 being compact, can be fit in tighter installations such as in buoys or mobile generation units.

In the systems 200 and 300, the central pedestal 50 is made up of reinforced concrete, composite material or steel. The central pedestal is necessarily strong enough to withstand tension in the tether and withstand compression loads. Being the heaviest part of the system, it is typically constructed on site to save transportation costs. The capstan rollers 52 and the motor-generators 54 are mounted on the central pedestal 50 to transfer the compression of the tether 01 as it squeezes the capstan rollers 52 into the center of the pedestal 50. This concrete pedestal is firmly anchored to the ground with a secure foundation to resist horizontal loads imparted to the pedestal from the high-tension line coming from the idler pulley (not shown). These horizontal loads could be of the order of 100,000 kilos of tension depending on the size of the system.

In addition to the concrete foundation cable hold-downs (not shown) are also used to secure the capstan rollers 52 in the same way as suspension bridges are secured. By using cable hold-downs, less concrete foundation might be needed.

A problem with the multi-capstan roller concept described herein above in the second and third embodiment is the movement of the tether as it passes onto and off away from each capstan roller. For instance, if a low coefficient of friction UHMWPE rope is used, about 8 full circumferential wraps around the 4 (or 8) capstan rollers 52 would be needed to secure the rope and harvest tension in the tether 01. In this situation the tether 01 would shift and rub internally inside the pedestal 50 about 32 times as it enters each capstan roller 52 and 32 times as it leaves each capstan roller 52. After shifting 64 times the tether 01 may be quite hot. This is potentially detrimental to the life of the tether 01. Any shifting of the tether 01 under great tension creates heat and may lower the working life of the tether 01 which could negatively affect the ROI of the system.

Figure 4:
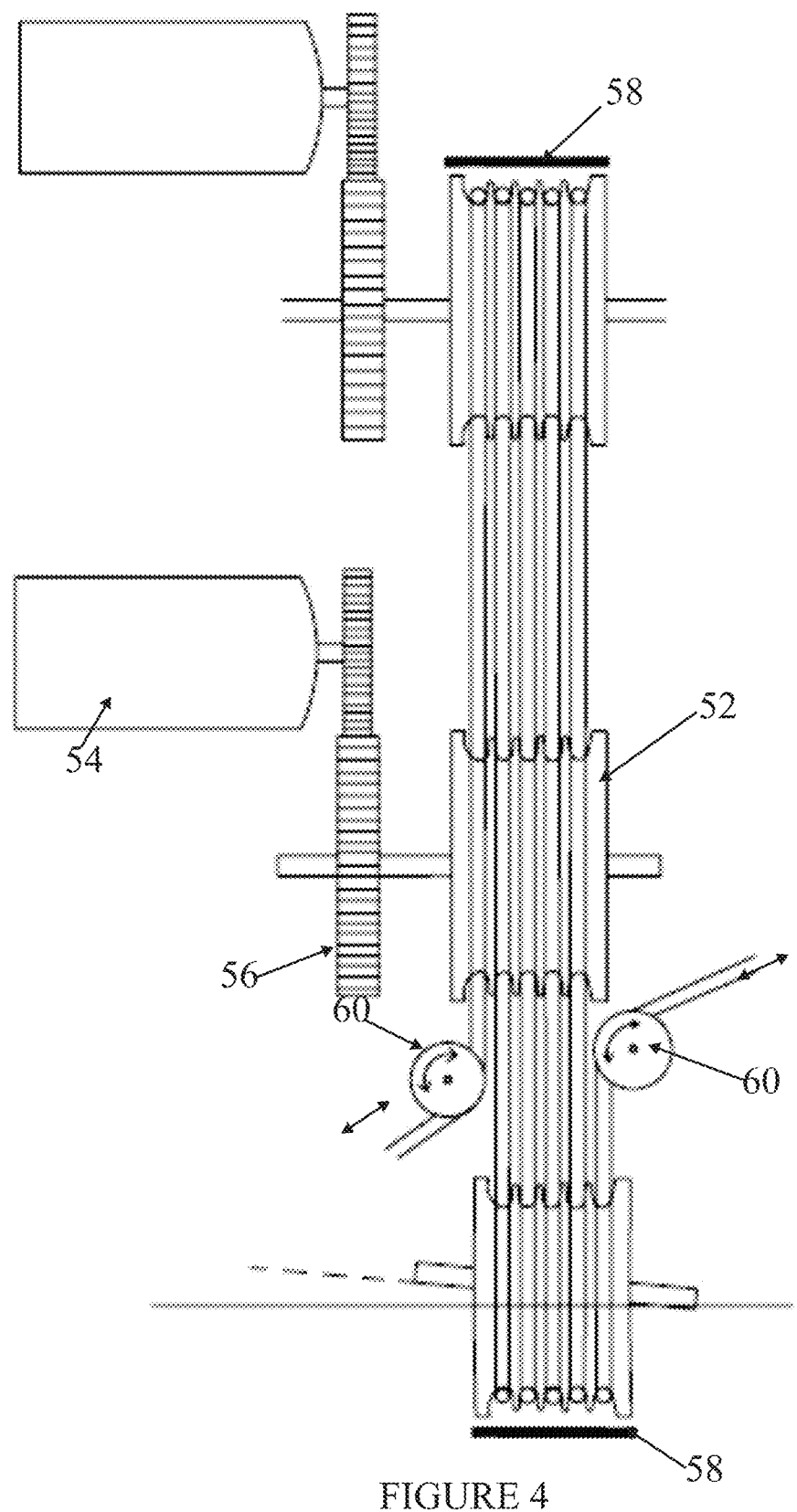
FIG. 4 illustrates a side view of the embodiment of FIG. 3 and is also indicative of the side view of the embodiment illustrated in FIG. 2.

FIG. 4 illustrates a side view of the embodiment of FIG. 3 and is also indicative of the side view of the embodiment illustrated in FIG. 2. As illustrated, the system facilitates 5 wraps of the tether 01 so as to have a good holding power when used with UHMWPE ropes with low coefficients of friction. The capstan rollers 52 are set at a slight angle, leaning slightly away from the capstan roller behind it to the capstan roller in front of it, to allow the tether 01 to spiral down through the 5 layers in a near straight line under great tension and speed similar to the threading on a bolt or a screw.

One advantage to the grooved roller design is that a keeper 58 can be used to lock the tether 01 in the grooves. This helps to keep the tether 01 in the correct groove especially at times of low tension when the tether 01 is in storage. Tension in the line may be near zero and the risk of it unthreading is high when the system is not working.

Figure 5:
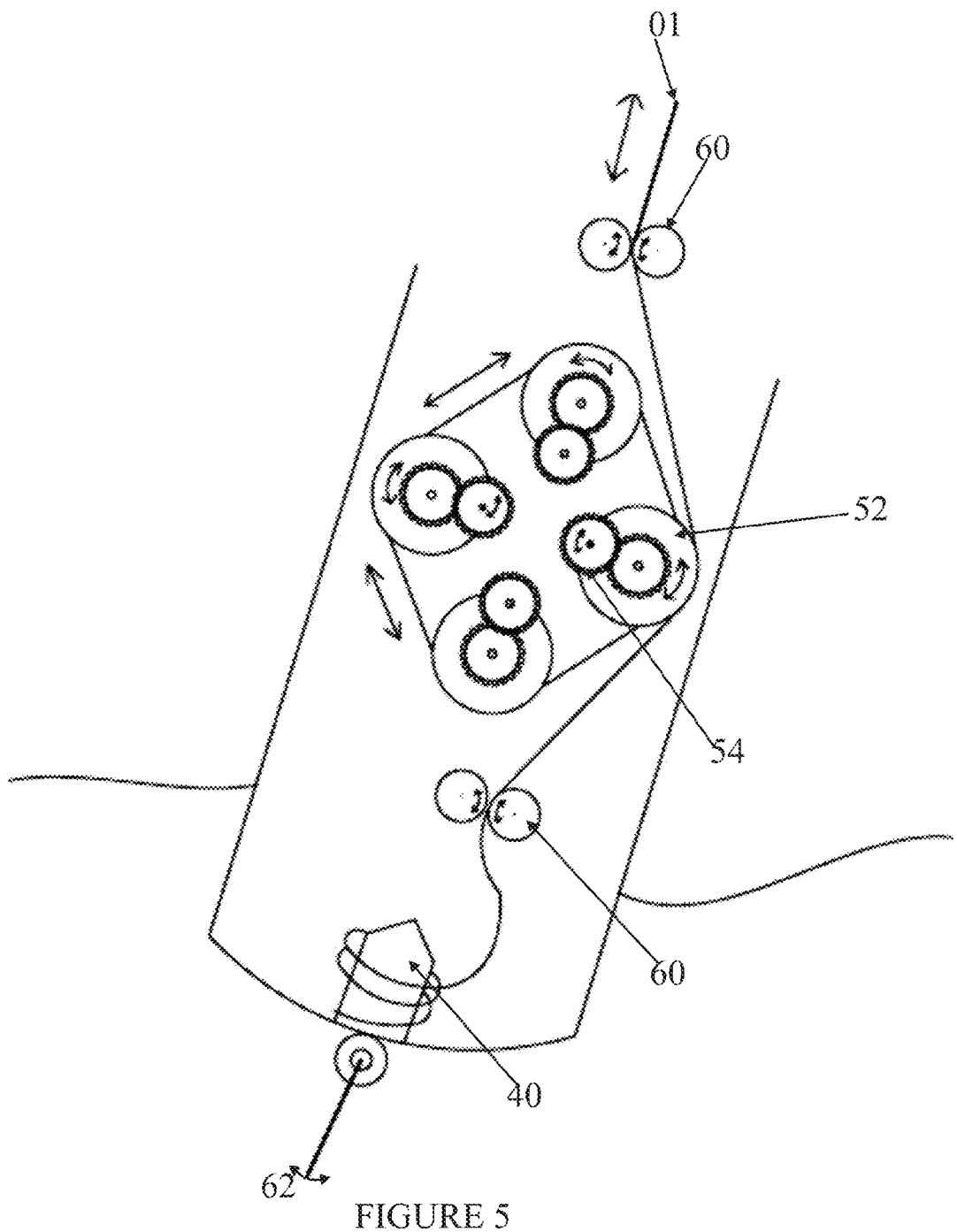
FIG. 5 illustrates a second alternative embodiment to the embodiment illustrated in FIG. 2, with a plurality (4 Nos.) of grooved capstan rollers mounted vertically in a buoy floating on a water surface.

FIG. 5 illustrates a second alternative embodiment to the embodiment illustrated in FIG. 3, with a plurality (4 Nos.) of grooved capstan rollers mounted vertically in a buoy floating on a water surface. It works with a rope tank storage device 40 instead of a storage reel. By using the rope tank in conjunction with the system 300, there is very little inertia of large steel wheels or the thousands of kilos of tether 01 on the spinning storage reel. With the rope tank 40, the direction of tether 01 can be changed almost instantly from outbound power generation to inbound motor mode with little energy being wasted. This embodiment is particularly configured for power generation when the tether 01 pays out and also for rope retraction in deep seas where wind power platforms are highly unfeasible. Here, an auxiliary tensioning device, in the form of a simple back tension device 60 is also illustrated that would always be needed at either end of the capstan. This is required to keep a minimum tension on the tether 01 at all times and prevent it from unraveling during low tension moments. The wheels of the back tension device 60 spin slightly slower or faster than the true speed of the tether 01, so that the friction generated keeps the tether 01 under some tension.

Figure 6:
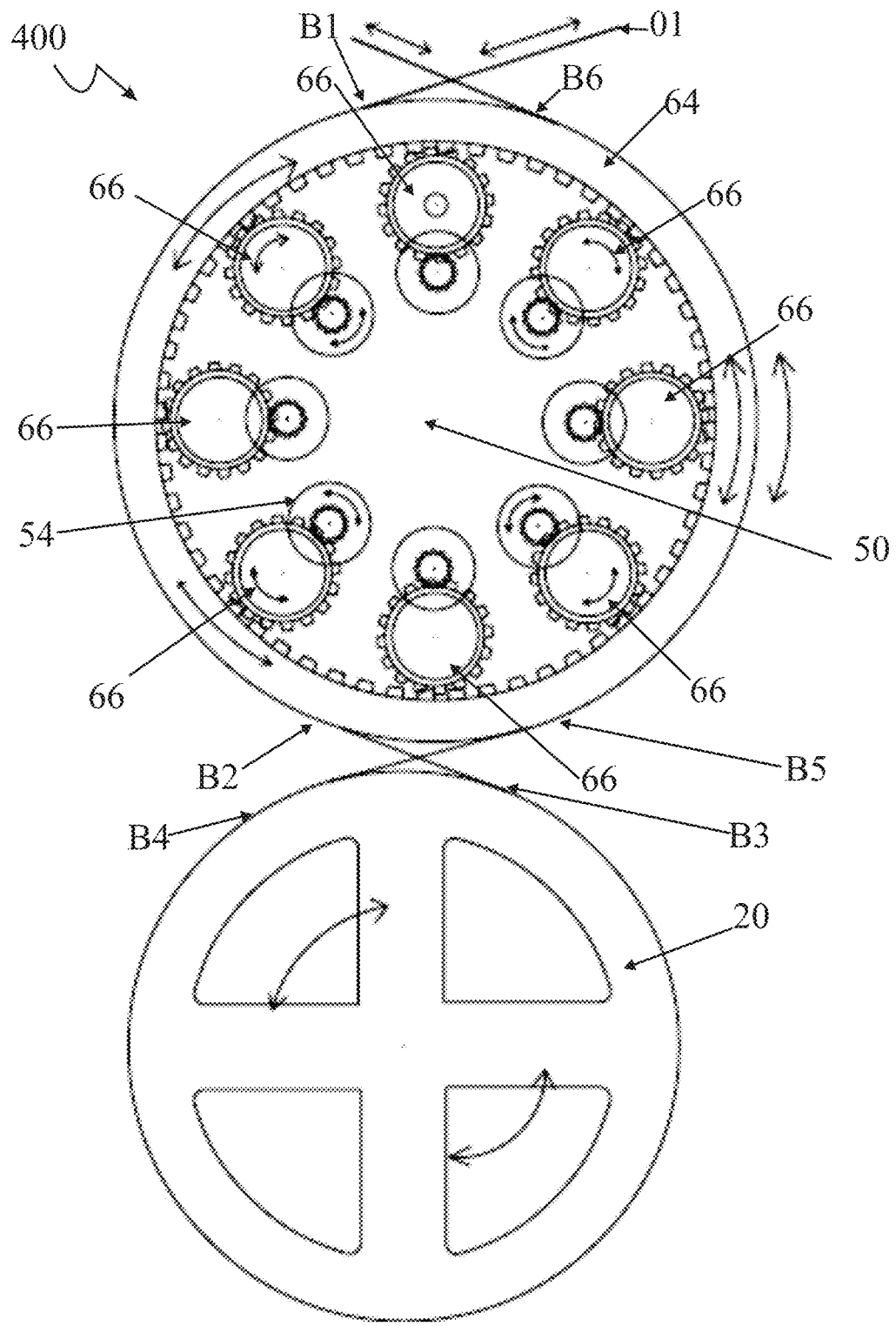
FIGS. 6 and 7 illustrate a preferred embodiment of the system of the present disclosure having a single capstan with multiple capstan faces and a transfer idler pulley.
Figure 7:
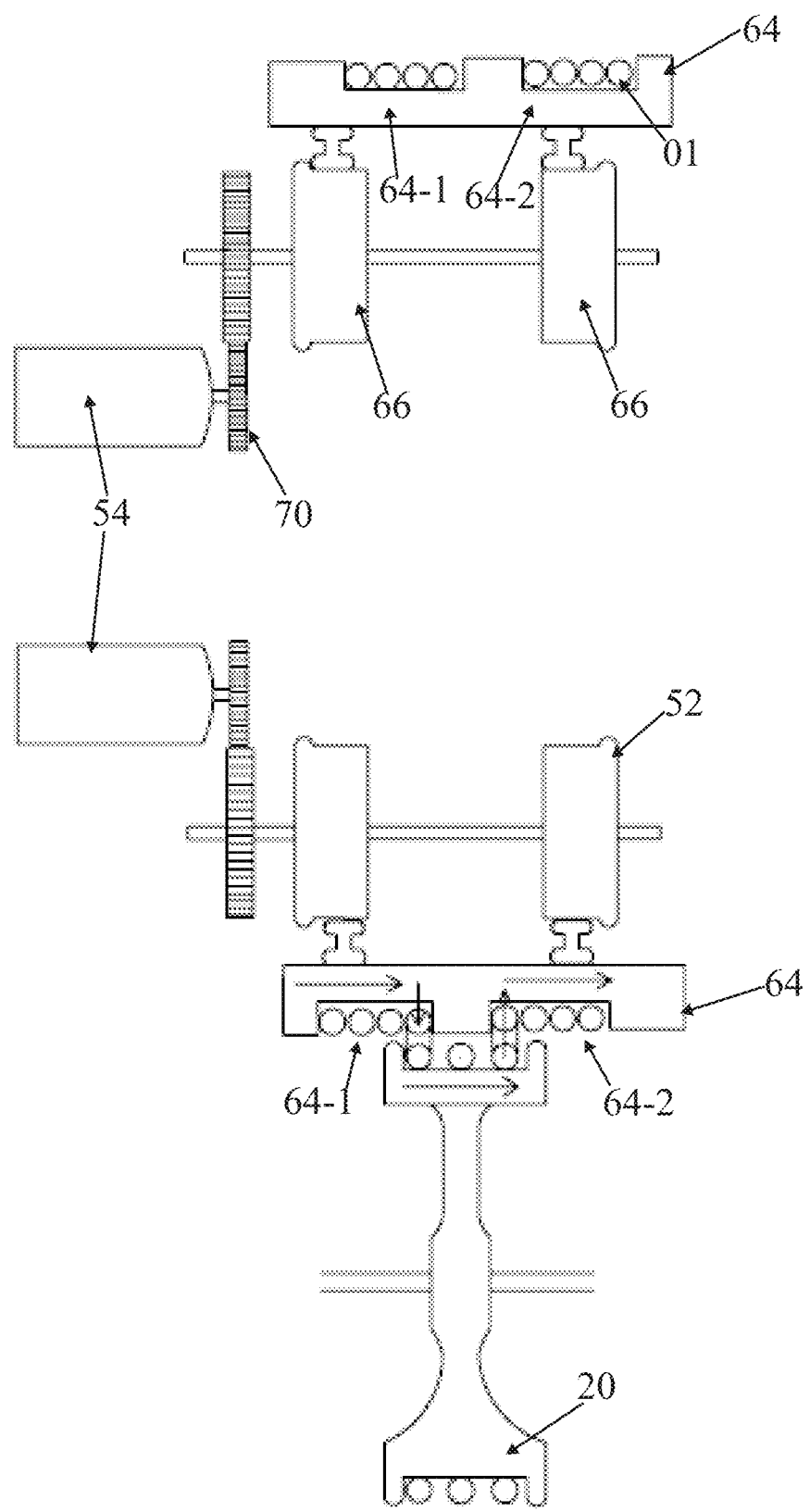

FIGS. 6 and 7 illustrate a preferred embodiment of the present disclosure having a single capstan ring (serving as a first capstan roller) with multiple capstan surfaces (obtained by grooves defined on the surface of the single capstan) and an auxiliary tensioning device in the form of a transfer idler, this preferred embodiment being represented generally by the reference numeral 400. The system 400 is an improvement over the system 100 shown in FIG. 1A. It obviates the problem of lesser number of wraps for UHMWPE tether around the larger diameter capstan. Further, the system 400 also solves the rope wear problem faced by the multi-capstan roller systems 200 and 300 of FIGS. 2 and 3. According to this embodiment, the system 400 includes a capstan ring 64 that is adapted to rotate about an axis as the tether 01 is wound around the capstan ring 64 and pulled by a wind power/hydropower system. The capstan ring 64 has a pedestal in the form of a concrete center section 50. Alternatively, the pedestal is a large wheel with an axel and bearing set disposed centrally. The inner periphery of the capstan ring 64 is geared to facilitate meshing with a plurality of gears 66 (serving as coupling arrangement) that in turn mesh with gears 70 (serving as second capstan rollers) on each of the motor-generators 54 (serving as converters) disposed along the inner periphery of the capstan ring 64 for transmitting rotational motion from the capstan ring 64 to the plurality of the motor-generators 54. Thus, one or any combination of motor-generators 54 can drive the capstan ring 64 during the rewinding operation. As all the motor generators 54 are geared to the capstan ring 64, there is no need for additional linkages, belt or chain drives for transmitting rotation torque from the capstan ring 64 to the motor-generators 54. The outer capstan ring 64 moves around like a solid track being meshed to the gears on each of the motor-generators 54 that are secured into the concrete center section 50. The single outer surface of the capstan ring 64 is split into two faces 64-1 and 64-2. The tether 01 makes few wraps around the first face 64-1 configured on the outer periphery of the capstan ring 64 and thereafter passes through an idler pulley 20, thereafter, the tether 01 passes through the second face 64-2 configured on the outer periphery of the capstan ring 64. The idler pulley 20 spins freely by virtue of tension and friction of the tether 01 as the tether travels around in the system 400. Faces 64-1 and 64-2 configured on the outer periphery of the capstan ring 64 ensure that there is no overlapping of the tether 01. The idler pulley 20 is positioned in such a manner that the angle of contact between the tether 01 and first face 64-1 and the second face 64-2 configured on the outer periphery of the capstan ring 64 is maximum. By splitting the single outer capstan ring 64 into two faces as illustrated, the system 400 permits use of adequate number of wraps required for UHMWPE rope having a low coefficient of friction.

The large idler pulley 20 itself works with 1 to 3 wraps and transfers the tether 01 down to the next capstan surface on the main capstan ring 64. For explanation, the system 400 may be considered to include three capstans in a row through which the tether 01 passes. The first capstan 64-1 takes out the majority of tension out of the tether 01 in its 3 to 4 wraps. The second capstan 20 takes out almost zero tension, because it is free spinning while going through about 3 more wraps. The third capstan 64-2 takes out the remaining tension with the last 3 to 4 wraps. Finally the tether leaves to go to the back tension device 60 and the storage rope tank or storage spool 40.

In accordance with another aspect of the present embodiment, the arrangement 400 employs two or three separate capstans each with separate sets of motor generators. In the system 400 illustrated in FIG. 6 and FIG. 7, only one set of motor-generators 54 is needed, which takes the power out at the same rate as faces 64-1 and 64-2 configured on the capstan face are part of the same outer capstan ring 64. With two or more separate capstans, the first capstan would generate a higher rate of power than the second one, where the majority of tension would have been harnessed. This would necessitate two sets of converters to cater to the different voltages of each capstan wheel. Further, the system 400 illustrated in FIG. 6 and FIG. 7 reduces the number of bends in the tether 01. The system 400 shows there are only 6 instances (B1-B6) where the rope bends as compared to 40 to 80 bends on the grooved multi-capstan rollers of the system 200. The diameter of the capstan rollers is also much bigger which also increases the life of the tether and thus the ROI. Although the system 400 is illustrated to include two capstan faces 64-1 and 64-2, and one idler pulley 20, in accordance with another aspect of the present embodiment, the system is configured to include a single capstan ring with three to five capstan faces (each with 1-4 wraps on each face) and 2 to 3 idler pulley faces on the same idler pulley. At some point in the system, a brake is also needed to lock the capstan in emergency situations, when there may be no power to the motor-generators or when additional holding/braking power is needed.

The coefficient of friction of the UHMWPE rope is typically between 0.9 and 1.2. This necessitates about 12 to 15 wraps around the capstan because the rope is quite slippery. Hence, two capstan faces and an idler pulley is the most practical embodiment. The system would be better with three capstan faces on a single capstan ring with two idler pulley, each face having 4 to 5 warps(×3 faces) resulting in a total of 12 to 15 wraps on the capstan ring. In accordance with other aspects of the present embodiment, the system can include 4 capstan faces with 3 idler pulleys or even 5 capstan faces with 4 idler pulleys.

Figure 8:
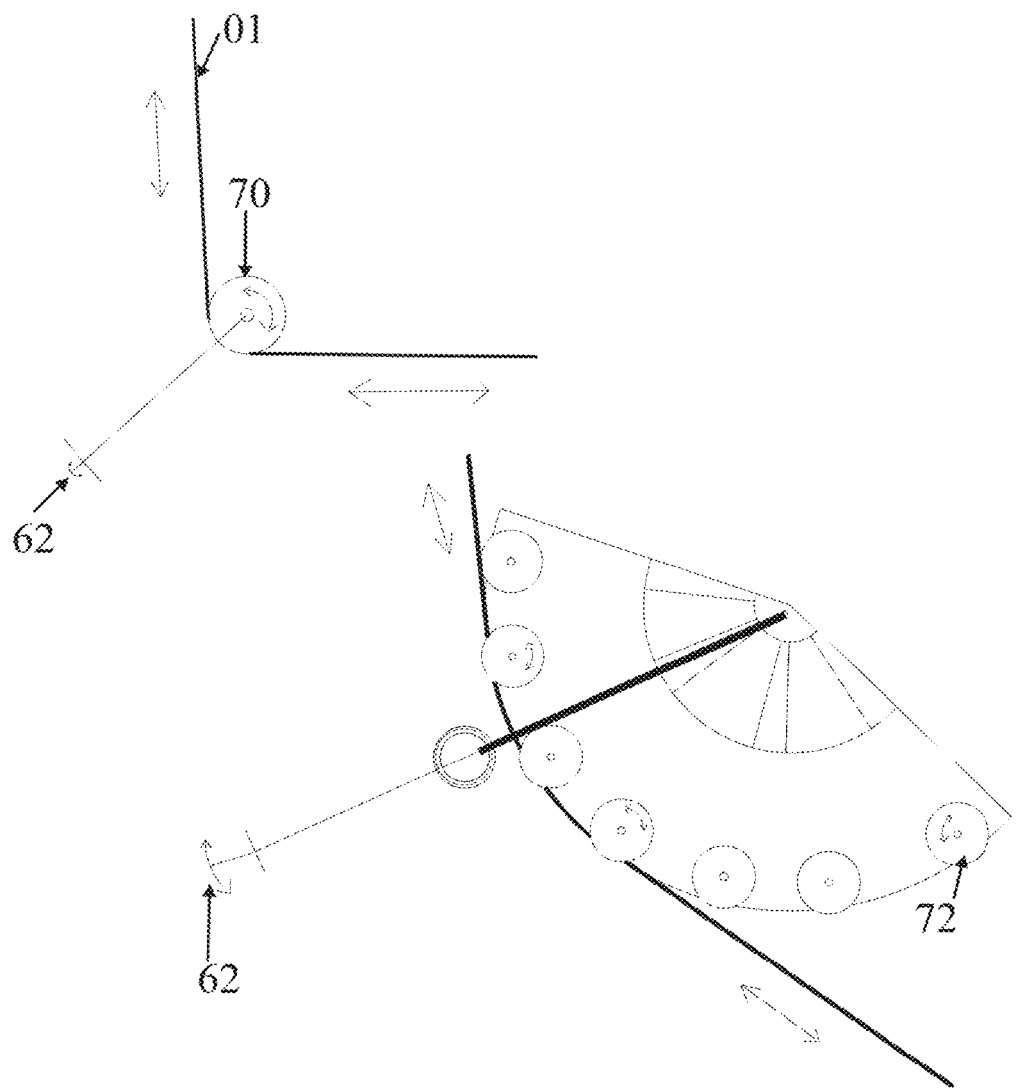
FIG. 8 shows a snatch block in accordance with the present disclosure, as an alternative to the kite tracker 10 illustrated in FIG. 1C.

FIG. 8 illustrates a tether handling arrangement in the form of a snatch block in accordance with the present disclosure, as an alternative to the kite tracker 10 illustrated in FIG. 1C. This is a simple effective way of changing the direction of the force acting on the tether 01 as it comes to the power system. In order to minimize the rope wear, a largest diameter sheave is needed for minimizing friction.

A plurality of rollers 72 are used here to give a general effect of a large radius sheave without the size thereof actually needed. Besides using multiple rollers 72, the same effect is also accomplished with a belt and roller system as illustrated in the kite tracker 10 of FIG. 1C. The advantage of this configuration being that firstly, the overall radius of the curve is made much bigger with smaller components than would be needed with a single sheave or wheel 70, and secondly, the multi-roller (or single roller) snatch block allows the tether to come from any azimuth or direction 360° around the power system. However, all tension force must be anchored through the snatch block tether to the ground. This requires a huge anchor 62 in the ground which is somewhat dynamic, because there is some horizontal and vertical movement of force resisted by the anchor depending on the snatch block location. The kite tracker 10 configuration is simpler because most of the force on the kite tracker 10 is pressed down into the ground instead of trying to pull out of it. With a snatch block 70 there is horizontal and vertical movement on the position of the rope as it exits to go to the "power extractor" or idler pulley. This slight change of position would need to be rectified by additional pulleys or sheaves that would direct the line exactly into the appropriate track of the capstan. The kite tracker 10 does this in a better manner, because the line from it to the idler pulley 20 is always in the exact center (center of the pivot) of the kite tracker 10. During slack condition, without any tension, the snatch block 70 does not support itself, unless some other means of support is provided.

Each of the embodiments explained herein above may be applied industrially depending on the needs/demands of the system and the merits of each embodiment.

Although the description provided herein above refers to wind power systems for ease of explanation, it does not limit the disclosure for use with wind power systems alone. The disclosure is equally applicable to hydropower systems. Also, power systems explained herein above are not limited to embodiments including capstan(s) and embodiments of the capstan(s) explained thereon.

The various embodiments of the power systems are also not limited to components explicitly described herein above or illustrated in the accompanying drawings. Generally, the power systems in accordance with the present disclosure also comprise the following components/subsystems for complete functioning of the power system:

measurement and control system comprising instrumentation and sensors for measuring and controlling parameters associated with said tether tensioning arrangement;

adjustment and alignment control system adapted to co-operate with said tether tensioning arrangement; and safety management system adapted to circumvent problems associated with debris, wear due to prolonged use and weather conditions.

TECHNICAL ADVANCEMENTS AND ECONOMIC SIGNIFICANCE

The technical advancements offered by the present disclosure include the realization of:

a ground based power system for efficiently handling tethers used in wind power/hydropower systems;

a ground based power system that reduces wear and tear of tethers used in wind power/hydropower systems;

a ground based power system that effectively harnesses tension and motion of tethers used in wind/hydro based power systems;

a ground based power system to harness tension and motion of tethers used in wind power/hydropower systems and converts it to other usable forms of power in a cost effective manner;

a ground based power system that is reliable;

a ground based power system that can be repaired while still in service;

a ground based power system that is robust in construction; and a ground based power system that is easy to maintain.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that values higher/lower than the numerical values assigned to the parameters, dimensions or quantities fall within the scope of the disclosure, unless there is a statement in the specification specific to the contrary.

The invention claimed is:

1. A power system comprising:
   a tether having a first end and a second end, the tether connected at said first end to a tensioning arrangement adapted to regulate tension in the tether, and a storage means at said second end;
   a tension harnessing arrangement comprising at least one first capstan roller arranged in a predetermined configuration, the tether tensioningly abutting at least a portion of the periphery of said at least one first capstan roller such that there is substantial contact between the tether and said at least one first capstan roller, thereby engaging said at least one first capstan roller to generate rotational energy; and
   at least one converter functionally co-operating with said at least one first capstan roller for converting said rotational energy to at least one of a transmissible form, storage form and dissipative form of energy.

2. The power system as claimed in claim 1, further comprising at least one second capstan roller engaged with said at least one first capstan roller by an engagement means selected from the group consisting of frictional contact and coupling arrangement provided therebetween, said coupling arrangement being at least one of a gear, chain, rope and belt-pulley arrangement, wherein said at least one converter is adapted to be coupled to said at least one second capstan roller.

3. The power system as claimed in claim 1, further comprising a tether handling arrangement disposed between said tensioning arrangement and said tension harnessing arrangement, said tether handling arrangement configured on at least one of a swivelable turn table, a snatch block and a sheave being adapted to facilitate twist free handling and free movement of the tether.

4. The power system as claimed in claim 1, further comprising at least one auxiliary tensioning device adapted to either receive the tether from said tension harnessing arrangement or guide the tether to said tension harnessing arrangement and further adapted to retain tension in the tether, said auxiliary tensioning device being at least one of an idler pulley, tensioning pulley and a back tensioning device.

5. The power system as claimed in claim 1, further comprising at least one auxiliary tensioning device disposed at a location selected from the group consisting of (i) between said tensioning arrangement and said tension harnessing arrangement, (ii) between said tension harnessing arrangement and said storage means and (iii) on either side of said tension harnessing arrangement.

6. The power system as claimed in claim 1, further comprising at least one of the subsystems selected from the group consisting of:
   measurement and control system comprising instrumentation and sensors for measuring and controlling parameters associated with said tether tensioning arrangement;
   adjustment and alignment control system adapted to co-operate with said tether tensioning arrangement; and
   safety management system adapted to circumvent problems associated with debris, wear due to prolonged use and weather conditions.

7. The power system as claimed in claim 1, wherein said tether tensioning arrangement is associated with at least one of wind power systems, hydropower systems and tethered vehicle control systems.

8. The power system as claimed in claim 1, wherein said storage means is adapted to store the tether and further adapted to facilitate smooth reeling in and payout of the tether.

9. The power system as claimed in claim 1, wherein said tether harnessing arrangement is anchored to the ground.

10. The power system as claimed in claim 1, wherein said first capstan rollers are engaged to each other by an engagement means selected from the group consisting of gear, chain, rope and belt-pulley arrangement.

11. The power system as claimed in claim 1, wherein said predetermined configuration is achieved on a pedestal adapted to withstand tension in the tether and compression loads in said tether harnessing arrangement.

12. The power system as claimed in claim 1, wherein said predetermined configuration is achieved on a pedestal being at least one of reinforced concrete core, composite material core and steel core.

13. The power system as claimed in claim 1, wherein said predetermined configuration is a curved profile with said first capstan rollers being disposed along the periphery thereof.

14. The power system as claimed in claim 1, wherein said predetermined configuration is a polygon with said first capstan rollers being disposed at least at vertices thereof.

15. The power system as claimed in claim 1, wherein said predetermined configuration is a polygon with said first capstan rollers being disposed at least at vertices thereof with an angle of contact between the tether and at least some of said first capstan rollers is at least one of 45 degrees and 90 degrees.

16. The power system as claimed in claim 1, wherein said at least one first capstan roller has at least one groove configured thereon, wherein each of said grooves is adapted to receive at least a portion of the tether therein.

17. The power system as claimed in claim 1, wherein said first capstan rollers are disposed such that the axles of said first capstan rollers are at a pre-determined angle with respect to each other.

18. The power system as claimed in claim 1, wherein said converter is selected from the group of energy conversion means consisting of motor generators, linear motor generators, hydraulic motors, compressors and pumps.

19. A power system comprising:
   a tether having a first end and a second end, the tether connected at said first end to a tensioning arrangement adapted to regulate tension in the tether, and a storage means at said second end; and
   a tension harnessing arrangement comprising at least one converter, the tether tensioningly abutting at least a portion of the periphery of said at least one converter such that there is substantial contact between the tether and said at least one converter, thereby engaging said at least one converter to generate energy in at least one of a transmissible form, storage form and dissipative form of energy.

20. The power system as claimed in claim 19, wherein said converter is selected from the group of energy conversion means consisting of motor generators, linear motor generators, hydraulic motors, compressors and pumps.

* * * * *